C. B. & S. Galentine & A. J. Russell,
Hoof Expander.
Nº 16,273.   Patented Dec. 23, 1856.
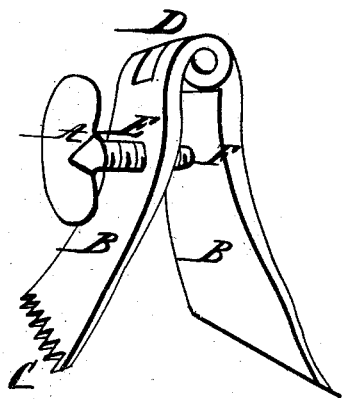

UNITED STATES PATENT OFFICE.

C. B. GALENTINE, SAML. GALENTINE, AND ANDREW J. RUSSELL, OF NUNDA, NEW YORK.

IMPROVED HOOF-EXPANDER.

Specification forming part of Letters Patent No. 16,273, dated December 23, 1856.

*To all whom it may concern:*

Be it known that we, C. B. GALENTINE, SAMUEL GALENTINE, and ANDREW J. RUSSELL, of the town of Nunda, county of Livingston, and State of New York, have invented a new and useful instrument or tool to be used in shoeing horses or mules, which we call a "self-sustaining hoof-expander;" and we do hereby declare that the following is a full and exact description thereof, reference being had to the accompanying drawings, and to the letters marked thereon.

The nature of our invention consists in expanding or spreading the hoof of the horse or mule by means of a self-sustaining instrument of iron, steel, or other suitable material so small as not to be in the way of the shoer while nailing the shoe to the foot, to be operated by a thumb-screw or other form of lever, thus avoiding the evils resulting from contraction of the feet or for the cure of the same.

To enable others skilled in the art to make and use our invention, we will proceed to describe its construction and operation.

It consists of two blades connected by a hinge at one end and bent somewhat outward, so as to enable the operator to place one of the lower serrated ends on either side of the frog of the animal's hoof, when, by means of a thumb-screw passing through one of the blades and striking its end against the opposite blade, the hoof may be expanded to any extent, as shown in the accompanying drafts.

What we claim as our invention, and desire to secure by Letters Patent, is—

The application of the above-described or any other instrument substantially the same worked by thumb-screw or other form of lever so small as not to interfere with the operation of nailing the shoe to the hoof of the animal.

C. B. GALENTINE.
SAMUEL GALENTINE.
A. J. RUSSELL.

Witnesses:
W. D. HAMMOND,
FRANCIS F. McNAIR.